(12) United States Patent
Kurian et al.

(10) Patent No.: US 6,426,398 B2
(45) Date of Patent: Jul. 30, 2002

(54) POLY (TRIMETHYLENE TEREPHTHALATE) POLYMER COMPOSITION

(75) Inventors: Joseph V Kurian, Newark, DE (US); Yuanfeng Liang, Chadds Ford, PA (US); Donald Edward Putzig, Newark, DE (US)

(73) Assignee: E. I. Du Pont De Nemours and Company, Wilmington, DE (US)

( * ) Notice: Subject to any disclaimer, the term of this patent is extended or adjusted under 35 U.S.C. 154(b) by 0 days.

(21) Appl. No.: 09/793,832

(22) Filed: Feb. 27, 2001

Related U.S. Application Data

(62) Division of application No. 09/500,340, filed on Feb. 8, 2000.

(51) Int. Cl.$^7$ .............................. C08G 63/78; C08K 3/10
(52) U.S. Cl. ........................ 528/279; 528/283; 528/302; 528/308; 528/308.6; 528/308.7; 524/783
(58) Field of Search ................................ 528/279, 283, 528/302, 308, 308.6, 308.7; 524/783

(56) References Cited

U.S. PATENT DOCUMENTS

| | | | |
|---|---|---|---|
| 3,056,818 A | * 10/1962 | Werber | |
| 3,936,421 A | * 2/1976 | Hayashi et al. | |
| 4,018,708 A | * 4/1977 | Vogt et al. | 252/431 |
| 4,020,010 A | * 4/1977 | Vogt et al. | 252/431 |
| 4,611,049 A | 9/1986 | Kuratsuji et al. | 528/279 |
| 5,015,759 A | * 5/1991 | Lowe | 560/91 |
| 5,340,909 A | * 8/1994 | Doerr et al. | 528/276 |
| 5,434,239 A | 7/1995 | Bhatia | 528/274 |
| 5,510,454 A | 4/1996 | Stouffer et al. | 528/308.1 |
| 5,540,868 A | 7/1996 | Stouffer et al. | 264/13 |
| 5,633,018 A | 5/1997 | Stouffer et al. | 425/8 |
| 5,663,281 A | 9/1997 | Brugel | 528/272 |
| 5,670,606 A | 9/1997 | Stouffer et al. | 528/272 |
| 5,677,415 A | 10/1997 | Bhatia | 528/176 |
| 5,763,104 A | 6/1998 | Stouffer et al. | 528/503 |
| 5,786,443 A | 7/1998 | Lowe | 528/272 |
| 5,811,496 A | 9/1998 | Iwasyk et al. | 525/444 |
| 5,840,957 A | 11/1998 | Kurian et al. | 560/92 |
| 5,891,985 A | 4/1999 | Brugel | 528/283 |
| 5,990,265 A | 11/1999 | Blanchard et al. | 528/272 |
| 6,093,786 A | 7/2000 | Kelsey | 528/271 |

FOREIGN PATENT DOCUMENTS

| | | | |
|---|---|---|---|
| JP | 08-232117 | 9/1996 | |
| JP | 08-311177 | 11/1996 | |
| JP | 08-325391 | 12/1996 | |
| WO | WO 98/23662 | 6/1998 | C08G/63/00 |
| WO | WO 99/54040 | 4/1999 | B01J/31/38 |
| WO | WO 00/17265 | 3/2000 | C08K/5/098 |

OTHER PUBLICATIONS

European Patent Office PCT International Search Report for counterpart application No. PCT/US 00/21782, mailed Nov. 28, 2000.

U.S. Patent Application No. 09/273,288, filed Mar. 19, 1999 and claiming priority from U.S. Provisional Patent Application No. 60/100,847, filed Sep. 18, 1998.

* cited by examiner

*Primary Examiner*—Samuel A. Acquah
(74) *Attorney, Agent, or Firm*—Lucas K. Shay; Mark D. Kuller

(57) ABSTRACT

A poly(trimethylene terephthalate) polymer composition (a) comprising repeat units derived from terephthalic acid and 1,3- propanediol, (b) having a b value of less than about 10, and (c) having an intrinsic viscosity (IV) in the range from about 0.74 to about 2.0. The poly(trimethylene terephthalate) polymer composition does not contain a blue masking pigment. It is prepared by a process comnprising contacting, in the presence of a catalyst comprises tin and titanium. A copolymer that contains up to 20 mole percent of another acid and/or a second alcohol is also disclosed. Further disclosed is a composition of, or comprising, a bis (3-hydroxypropyl) terephthalalte prepolymer. The bis (3-hydroxypropyl) terephthalalte prepolymer and poly (trimethylene terephthalalte) can each contain 10 to 100 ppm tin and 10 to 200 ppm titanium relative to the terephthalic acid content.

21 Claims, No Drawings

POLY (TRIMETHYLENE TEREPHTHALATE) POLYMER COMPOSITION

This application is a Divisional of application Ser. No. 09/500,340 filed on Feb. 8, 2000, which is incorporated herein by reference.

FIELD OF THE INVENTION

This invention relates to a process for producing a prepolymer and polyester from 1,3-propanediol by direct esterification in the presence of a catalyst comprising tin and titanium.

BACKGROUND OF THE INVENTION

Polyethylene terephthalate (PET) and polybutylene terephthalate (PBT), generally referred to as "polyalkylene terephthalates", are common commercial polyesters. Recently, poly(trimethylene terephthalate),(PTT), also called polypropylene terephthalate, has achieved commercial importance because of its elasticity, as measured by its elastic recovery and resilience. Based on the numbers of carbon atoms in the glycol used, the above PET, PBT and PTT are also referred to as 2GT, 4GT and 3GT, respectively.

Polyalkylene terephthalates commonly are produced by one of two routes: (1) by transesterification of a dialkyl terephthalate diester, typically dimethyl terephthalate, with a glycol to form an intermediate bis-glycolate terephthalate, followed by polycondensation to form the polyalkylene terephthalate; or (2) by direct esterification of terephthalic acid (TPA) with a glycol to form a bis-glycolate terephthalate, followed by polycondensation to form the polyalkylene terephthalate.

In producing polyalkylene terephthalates by direct esterification, terephthalic acid and an alkylene glycol are reacted in the presence of a catalyst to form a monomer and water. The water is removed as formed during the reaction. Oligomers having a degree of polymerization of about 4 or less can also be formed. Generally, during an esterification a mixture of monomer and oligomer is produced. This mixture, also referred to as a prepolymer, can then be polycondensed or polymerized at higher temperatures under reduced pressure in the presence of a polycondensation catalyst to form a desired polyester resin that is suitable for carpets, textiles, films and many other end-uses.

These reactions can be carried out in a batch or continuous process. The same or different catalysts can be used for the esterification and polycondensation steps.

Esterification catalysts known in the art include titanium, tin and zirconium compounds. Organo titanium and organo zirconium compounds are disclosed in U.S. Pat. No. 3,056,818 for use as esterification catalysts. The combination of organo tin and organo titanium compounds for the esterification of terephthalic acid and 1,4-butanediol is disclosed in U.S. Pat. No. 3,936,421. The use of tin-titanium complexes as esterification catalysts for 2GT and 4GT is disclosed in U.S. Pat. Nos. 4,018,708 and 4,020,010. U.S. Pat. No. 5,015,759 (DuPont) discloses a process for faster direct esterification of a diacid to make 2GT or 4GT using relatively high amounts of an organo titanium, organo tin or organo zirconium catalyst. None of these references discloses or suggest that any of these catalysts can be used to produce 3GT.

The use of 3GT is handicapped by various difficulties in its preparation. Surprisingly, using direct analogs of the processes developed for preparation of 2GT and 4GT do not necessarily give 3GT with satisfactory properties.

For example, relatively high temperature (about 290° C.) esterification is considered commercially acceptable for 2GT made from TPA. However, esterification to produce 3GT under similar process conditions appeared to result in the significant liberation of undesirable by-products, including acrolein and allyl alcohol. In addition, the intermediate 3GT prepolymer was found to be highly discolored under these conditions, an indication of poor 3GT polymer quality. Similar esterification difficulties in processes for the production of 4GT prepolymer by direct esterification have led to a preference for the transesterification route using dimethylterephthalate instead of terephthalic acid. For 3GT, because of the greater availability of terephthalic acid in many countries, it is important to develop a low temperature esterification process for the commercial production of good quality 3GT prepolymer.

U.S. Pat. No. 4,611,049 discloses a process for producing 3GT or 4GT using a sulfonic acid promoter to increase the rate of polymerization when using an organo titanium or organo tin catalyst.

U.S. Pat. No. 5,340,909 discloses the use of an effective catalytic amount of tin for the polycondensation step to make 3GT, wherein about 100 to 650 ppm of tin based on the terephthalic acid is given as the permissible range. To mask the resulting polymer yellowness, a blue pigment may be added prior to the polycondensation step. When the prepolymer is made by direct esterification, a titanium catalyst (0–125 ppm) or a portion of the above tin catalyst (0–650 ppm) may be used during this step. No examples show the use or benefit of either titanium or tin catalysts or both for direct esterification.

In the above processes for 3GT, too high an amount of catalyst results in a color problem, while too low an amount results in an unacceptably slow reaction. In particular, using a high concentration of tin catalyst is inadvisable since it causes discoloration and degradation of polymer as well as the formation of large amounts of undesirable by-products. In addition, a high amount of tin compounds remaining in the final polymer may be undesirable in certain end-use applications. None of the above references specifically disclose a combination of tin and titanium catalysts for the direct esterification of terephthalic acid with 1,3-propylene glycol, nor is there any information to suggest that there would be any advantage in using a combination of these two catalysts for this process.

There is a need for an improved process for the direct esterification of an acid such as, for example, terephthalic acid with 1,3-propylene glycol. There is also a need to reduce the reaction time for esterification, carry out the esterification at relatively lower temperatures, reduce the concentration of tin in the resulting polymer, and produce a product with improved color without the need of a masking pigment.

SUMMARY OF THE INVENTION

In a first embodiment, the invention is directed to a process comprising contacting an acid with 1,3-propanediol in the presence of a catalyst comprising tin and titanium.

In a second embodiment, the invention is directed to a composition of, or comprising, a bis(3-hydroxypropyl) terephthalate prepolymer that can contain 10 to 100 ppm tin and 10 to 200 ppm titanium relative to the terephthalic acid content.

In a third embodiment, the invention is directed to a composition of, or comprising, a poly(trimethylene terephthalate) polymer that can contain 10 to 100 ppm tin and 10 to 200 ppm titanium relative to the terephthalic acid content.

DETAILED DESCRIPTION OF THE INVENTION

The term "tin" and "titanium" used herein, unless otherwise indicated, are interchangeable with "tin compound" or "titanium compound".

A prepolymer such as, for example, 3GT prepolymer is prepared by the catalytic esterification of terephthalic acid with 1,3-propanediol. The prepolymer can be then polymerized at a higher temperature, using the same or additional catalysts, to make the 3GT polymer.

The process of the invention comprises contacting an acid, preferably an organic diacid, with 1,3-propanediol in the presence of a catalyst comprising tin and titanium. Any acids that can produce an ester or polyester, when contacted with a glycol, can be used.

The presently preferred organic diacid is an organic acid having the formula of $HO_2CACO_2H$ in which A is an alkylene group, an arylene group, alkenylene group, or combinations of two or more thereof. Each A has about 2 to about 30, preferably about 3 to about 25, more preferably about 4 to about 20, and most preferably 4 to 15 carbon atoms per group. Examples of suitable organic acids include, but are not limited to, terephthalic acid, isophthalic acid, naphthalenedicarboxylic acid, succinic acid, adipic acid, phthalic acid, glutaric acid, and combinations of two or more thereof. The presently preferred organic diacid is terephthalic acid or naphthalenedicarboxylic acid because the polyesters such as, for example, 3GT, produced therefrom have a wide range of industrial applications.

Any tin-containing compounds that can be used as an esterificatin catalyst can be used. Generally, it can be an inorganic tin compound or an organic tin compound. Examples of suitable tin compounds include, but are not limited to, n-butylstannoic acid, octylstannoic acid, dimethyltin oxide, dibutyltin oxide, dioctyltin oxide, diphenyltin oxide, tri-n-butyltin acetate, tri-n-butyltin chloride, tri-n-butyltin fluoride, triethyltin chloride, triethyltin bromide, triethyltin acetate, trimethyltin hydroxide, triphenyltin chloride, triphenyltin bromide, triphenyltin acetate, or combinations of two or more thereof These tin compounds are believed commercially available. For example, n-butylstannoic acid can be obtained from the Witco Chemical Company.

According to the invention, the preferred titanium compounds are organic titanium compounds. Titanium tetrahydrocarbyloxides, also referred to as tetraalkyl titanates herein, are presently most preferred organic titanium compounds because they are readily available and effective. Examples of suitable titanium tetrahydrocarbyloxide compounds include those expressed by the general formula $Ti(OR)_4$ where each R is individually selected from an alkyl or aryl radical containing from 1 to about 30, preferably 2 to about 18, and most preferably 2 to 12 carbon atoms per radical and each R can be the same or different. Titanium tetrahydrocarbyloxides in which the hydrocarboxyl group contains from 2 to about 12 carbon atoms per radical which is a linear or branched alkyl radical are most preferred because they are relatively inexpensive, more readily available, and effective in forming the solution. Suitable titanium tetrahydrocarbyloxides include, but are not limited to, titanium tetraethoxide, titanium tetrapropoxide, titanium tetraisopropoxide, titanium tetra-n-butoxide, titanium tetrahexoxide, titanium tetra 2-ethylhexoxide, titanium tetraoctoxide, and combinations of two or more thereof.

The titanium tetrahydrocarbyloxides suitable for use in the present invention can be produced by, for example, mixing titanium tetrachloride and an alcohol in the presence of a base, such as ammonia, to form the titanium tetracarbyloxide or tetraalkyl titanate. The alcohol can be ethanol, n-propanol, isopropanol, n-butanol, or isobutanol. Titanium tetrahydrocarbyloxides thus produced can be recovered by first removing by-product ammonium chloride by any means known to one skilled in the art such as filtration followed by distilling the titanium tetrahydrocarbyloxides from the reaction mixture. This process can be carried out at a temperature in the range of from about 0 to about 150° C. Titanates having longer alkyl groups can also be produced by transesterification of those having R groups up to $C_4$ with alcohols having more than 4 carbon atoms per molecule.

Examples of commercially available organic titanium compounds include, but are not limited to, TYZOR® TPT and TYZOR® TBT (tetra isopropyl titanate and tetra n-butyl titanate, respectively) available from E. I. du Pont de Nemours and Company, Wilmington, Del., U.S.A.

The weight ratio of the tin compound to the titanium compound can be any ratio so long as the ratio can catalyze the esterification of an acid and 1,3-propanediol. Generally, the ratio can be about 0.01:1 to about 100:1 and preferably about 0.1:1 to about 10: 1.

According to the invention, the invention process can also comprise contacting an acid with 1,3 propanediol in the presence of a second glycol. The amount of the second glycol incorporated into the final polyester can be up to about 20 mole percent of the polyester. The present invention process can also produce a copolymer in which the majority of repeat units are derived from terephthalic acid and 1,3-propanediol and up to 20 mole percent of the repeat units are derived from another acid or the second glycol or both.

The presently preferred second glycol has the formula of $R(OH)_n$, an alkylene glycol of the formula $(HO)_nA(OH)_n$, or combinations thereof in which R and A are the same as those disclosed above and n is 1 to about 10, preferably 1 to about 7, and most preferably 1 to 5. Examples of suitable second glycols include, but are not limited to, ethylene glycol, propylene glycol, isopropylene glycol, butylene glycol, 1-methyl propylene glycol, pentylene glycol, diethylene glycol, triethylene glycol, and combinations of two or more thereof. The presently most preferred second glycol is an alkylene glycol such as ethylene glycol.

According to the invention, the esterification catalyst can be present in any concentration in the esterification medium so long as the amount can catalyze the esterification of an acid. Generally, the weight of the catalyst can be in the range of about 1 to about 1,000 and preferably about 5 to about 500 mg of the catalyst per kg of the acid.

The catalyst can be produced by any method known to one skilled in the art. For example, it can be produced by separately combining the tin compound or titanium compound with the acid or 1,3-propanediol in an esterification medium. It can also be produced in situ in an esterification medium by combining the tin compound or titanium compound with the acid, 1,3-propanediol, or both. Preferably, it is produced by combining the tin compound or titanium compound before the contacting with the acid or 1,3-propanediol in an esterification medium. In other words, it is preferred that a premixed catalyst comprising, consisting essentially of, or consisting of the tin compound and the titanium compound be produced before being contacted with the acid or 1 ,3-propanediol.

More preferably, the tin and titanium catalysts are mixed in an organic solvent before adding to the reaction mass. Any solvent that can substantially dissolve or disperse the catalyst and does not interfere with polymerization can be used. For convenience, the organic solvent can be 1,3-propanediol.

Preferably, the amount of tin used as catalyst is between about 10 and 100 ppm and the amount of titanium used as catalyst is between about 10 and 200 ppm, each elemental amount based on the weight of acid present in the esterification medium.

The molar ratio of 1,3-propanediol to the acid can be any ratio so long as the esterification can take place. Presently it is preferred that the ratio be in the range of about 0.1:1 to about 10:1, preferably about 0.5:1 to about 5:1, and most preferably 1.1:1 to about 2.2:1. The esterification can be carried out under any condition known to one skilled in the art. The condition can include a temperature from about 100° C. to about 300° C., preferably about 155 C. to about 250° C. The esterification can be carried out under any pressure that can accommodate the temperature.

In the second embodiment, a composition of, or comprising, a bis(3-hydroxypropyl) terephthalate prepolymer is provided. The prepolymer can be produced by the process or other processes. The composition can contain about 10 to 100 ppm tin and 0 to 200 ppm titanium relative to the terephthalic acid content. The term "ppm" used herein refers to mg of elemental tin or titanium per kg terephthalic acid.

The prepolymer can be produced by either batch or continuous processes. In a batch process, the terephthalic acid is contacted with 1,3-propanediol in the presence of a catalyst. In a continuous process, the terephthalic acid and 1,3-propanediol are combined with a recirculating stream of prepolymer in the presence of a catalyst. Variations of these processes can also be used, as will be apparent to one skilled in the art. The reaction temperature can range from about 100 to about 300° C., and at a pressure that can accommodate the temperature range. The preferred temperature ranges from about 155 to 250° C. It is also preferred that 1,3-propanediol be present in a slight molar excess compared to the terephthalic acid as disclosed above. Terephthalic acid is commercially available from E. I. duPont de Nemours and Company and 1,3-propanediol is commercially available from the Degussa Corporation.

In the third embodiment, a composition of, or comprising, a poly(trimethylene terephthalate) polymer is provided. The poly(trimethylene terephthalate) polymer can have an intrinsic viscosity (IV) in the range from about 0.3 to about 2.0 and a b value in the range of from less than about 10, preferably less than 8, more preferably less than about 6, and most preferably less than about 5.

The composition can be produced from the prepolymer disclosed above and can contain 10 to 100 ppm tin and 10 to 200 ppm titanium relative to the terephthalic acid content. The term "ppm" used herein refers to mg of elemental tin or titanium per kg terephthalic acid.

The composition can be produced by a polymerization process, which is also known as polycondensation in which a prepolymer is polycondensed to form a polyester such as, for example, poly(trimethylene terephthalate) or 3GT, with the elimination of alcohol, as is known in the art. Typically, the alcohol can be removed by distillation under reduced pressure. The catalyst disclosed above can be used in the polycondensation step alone or with an additional catalyst. Polymerization can be continued until the resulting polymer has the desired degree of polycondensation, as measured by its IV. Intrinsic viscosity is determined by measuring the flow time of a solution of known polymer concentration and the flow time of the polymer solvent in a capillary viscometer, as set forth in ASTM D2857.95.

The color of the resulting polymer is measured in terms of the L-value and b-value, using an instrument such as the SP-78 Spectrophotometer. The L-value shows brightness, with the greater the numerical value showing higher (desirable) brightness and the b-value shows the degree of yellowness, with a higher numerical value showing a higher (undesirable) degree of yellowness.

The following examples further illustrate the invention and are not to be construed to unduly limit the scope of the invention. The comparative examples show the use of tin or titanium catalysts without the other being present. These results are summarized and compared with the examples using the inventive combinations of tin and titanium catalysts in subsequent Table 1.

Comparative Example 1

This example demonstrates the esterification reaction of terephthalic acid with 1,3-propanediol using only n-butylstannoic acid as the esterification catalyst to form bis(3-hydroxypropyl) terephthalate.

A 250 ml flask equipped with a stirrer was charged with 66.5 g of terephthalic acid (TPA), 48.7 g of 1,3-propanediol and 35 mg of n-butylstannoic acid (298 ppm tin based on TPA) for a molar ratio of 1,3-propanediol:TPA of 1.6:1. The flask was then purged with nitrogen and the contents of the flask were heated with stirring. When the temperature reached about 210 ° C., water started to evolve. The temperature was held at 210° C., and it took 3 hours to reach a clear solution indicating the end of esterification reaction.

Comparative Example 2

This example demonstrates the esterification reaction of terephthalic acid with 1,3-propanediol using n-butylstannoic acid (149 ppm tin based on TPA) as the esterification catalyst. The procedure of Comparative Example 1 was followed except that 17.4 mg of n-butylstannoic acid was used as the esterification catalyst. It took 4.5 hours to reach a clear solution .

Upon the completion of esterification, the resulting monomer was polymerized in the same reaction vessel at a temperature of 250° C. and a pressure of 0.2 mm Hg in presence of an additional 62 ppm titanium based on TPA. The poly(trimethylene terephthalate) resin color and intrinsic viscosity (IV) are given in Table 1.

Comparative Example 3

This example demonstrates the esterification reaction of terephthalic acid with 1,3-propanediol using n-butylstannoic acid (99 ppm of tin based on TPA) as the esterification catalyst. The procedure of Comparative Example 1 was followed except that 11.6 mg of n-butylstannoic acid was used as the esterification catalyst. It took 5.5 hours at 210° C. to reach a clear solution.

Comparative Example 4

This example demonstrates the esterification reaction of terephthalic acid with 1,3-propanediol using n-butylstannoic acid (62 ppm of tin based on TPA) as the esterification catalyst. The procedure of Comparative Example 1 was followed except that 7.2 mg of n-butylstannoic acid was used as the esterification catalyst. It took 9 hours at 210° C. to reach a clear solution.

Comparative Example 5

This example demonstrates the esterification reaction of terephthalic acid with 1,3-propanediol in the absence of a catalyst. The procedure of Comparative Example 1 was followed except that no catalyst was used. It took more than 16 hours at 210° C. to reach a clear solution.

Comparative Example 6

This example demonstrates the esterification reaction of terephthalic acid with 1,3-propanediol using tetraisopropyl titanate (62 ppm of Ti based on TPA) as the esterification catalyst. The procedure of Comparative Example 1 was followed except that 24.4 mg of tetraisopropyl titanate was used as the esterification catalyst. It took 7.5 hours at 210° C. to reach a clear solution.

EXAMPLE 1

This example demonstrates the esterification reaction of terephthalic acid with 1,3-propanediol using a combination of n-butylstannoic acid (31 ppm of tin based on TPA) and tetraisopropyl titanate (62 ppm of Ti based on TPA) as the esterification catalyst. The procedure of Comparative Example 1 was followed except that 3.6 mg of n-butylstannoic acid and 24.4 mg of tetraisopropyl titanate were used as the esterification catalyst. It took 6 hours 45 minutes at 210° C. to reach a clear solution indicating the end of the esterification reaction.

EXAMPLE 2

This example demonstrates the esterification reaction of terephthalic acid with 1,3-propanediol using combination of n-butylstannoic acid (99 ppm of tin based on TPA) and tetraisopropyl titanate (62 ppm of Ti based on TPA) as the esterification catalyst. The procedure of Comparative Example 1 was followed except that 11.6 mg of n-butylstannoic acid and 24.4 mg of tetraisopropyl titanate was added separately as the esterification catalyst. It took 4 hours 15 minutes at 210° C. to reach a clear solution. Thereafter, the resulting monomer was polymerized in the same reaction vessel at a temperature of 250° C. and a pressure of 0.2 mm Hg without any additional catalyst. The poly(trimethylene terephthalate) resin color and IV are given in Table 1.

EXAMPLE 3A

This example demonstrates the esterification reaction of terephthalic acid with 1,3-propanediol using a pre-mixed solution of n-butylstannoic acid (99 ppm of tin based on TPA) and tetraisopropyl titanate (62 ppm of Ti based on TPA) as the esterification catalyst. The procedure of Comparative Example 1 was followed except that 11.6 mg of n-butylstannoic acid and 24.4 mg of tetraisopropyl titanate were used as the esterification catalyst, which were premixed in 1,3-propanediol at room temperature. It took 3 hours 10 minutes at 210° C. to reach a clear solution.

Upon the completion of esterification, the resulting monomer, bis(3-hydroxypropyl) terephthalate, was polymerized in the same vessel at a temperature of 250 ° C. and a pressure of 0.2 mm Hg without additional catalyst. The poly(trimethylene terephthalate) resin obtained had an IV of 0.78 dl/g and melting point of 230° C. (measured as the peak on the endotherm of differential scanning calorimeter, DSC).

EXAMPLE 3B

The procedure of example 3A was repeated. It took 3 hours 15 minutes at 210° C. to reach a clear solution. After polymerization, the poly(trimethylene terephthalate) resin obtained had an intrinsic viscosity of 0.89 dl/g.

Table 1 summarizes the results of the above examples. The catalyst concentration used during the esterification reaction is given in the table as the parts per million (ppm) relative to the weight of TPA or as mg catalyst per kg TPA.

TABLE 1

Direct Esterification Time and Polymer Quality

| Example | Esterification Catalyst ppm (Sn/Ti) | Esterification Time (hour) | Polymer Color | Polymer Viscosity (IV) |
|---|---|---|---|---|
| Comp.Ex. 1 | 298/0 | 3.0 | | |
| Comp Ex. 2 | 149/0 | 4.5 | L = 74.8; b = 4.2 | 0.74 |
| Comp.Ex. 3 | 99/0 | 5.5 | | |
| Comp.Ex. 4 | 62/0 | 9 | | |
| Comp.Ex. 5 | 0/0 | 16 | | |
| Comp.Ex. 6 | 0/62 | 7.5 | | |
| Example 1 | 31/62 | 6.75 | | |
| Example 2 | 99/62 | 4.25 | L = 75; b = 4.06 | 0.74 |
| Ex. 3A (premix) | 99/62 | 3.17 | L = 76.1; b = 2.77 | 0.78 |
| Ex. 3B (premix) | 99/62 | 3.25 | L = 76.1; b = 2.98 | 0.89 |

The results show that the tin content of the prepolymer of the invention process (Example 1), in comparison to Comparative Example 4, decreased by 50% while the reaction time is cut by 25%. It demonstrated that the invention process increased the reaction rate at lower tin content.

The results also show that the tin content of the prepolymer (Example 2), in comparison to Comparative Example 2, decreased by a third while the reaction rate and product color were also improved.

The results further show that the invention process greatly improved over the known process when the invention catalyst was premixed. Example 3A and 3B, in comparison to Example 2, show that premixing the tin and titanium catalysts had the shortest the reaction time and produced a polymer having the highest L value, lowest b value, and highest IV among those tested.

In summary, the invention catalyst, a combination of tin and titanium catalysts, completes esterification faster than the individual catalyst components thereby minimizing the time and temperature required for esterification. The invention product is a polyester such as 3GT of high quality having low tin concentration. A high concentration of tin compounds causes discoloration and degradation of polymer as well as the formation of large amounts of by-products. Furthermore, the invention catalyst can be used for both esterification and polycondensation thereby eliminating the need for a separate catalyst during the polycondensation step.

That which is claimed is:

1. A poly(trimethylene terephthalate) polymer composition (a) comprising repeat units derived from terephthalic acid and 1,3-propanediol, (b) having a b value of less than about 10, and (c) having an intrinsic viscosity (IV) in the range from about 0.74 to about 2.0, which poly(trimethylene terephthalate) polymer composition does not contain a blue masking pigment, prepared by a process comprising contacting, in the presence of a catalyst, terephthalic acid with 1,3-propanediol wherein said catalyst comprises tin and titanium.

2. The composition of claim 1 which composition does not contain any masking pigment.

3. The composition of claim 1 wherein said b value is less than about 8.

4. The composition of claim 1 wherein said b value is less than about 6.

5. The composition of claim 1 wherein said b value is less than about 5.

6. The composition of further comprising repeat units derived from a second acid, a second glycol, or both.

7. The composition of claim 1 wherein said b value is 4.06 or less.

8. The composition of claim 1 wherein the L value is 75 or higher.

9. The composition of claim 1 wherein said b value is 2.77–4.06.

10. The composition of claim 1 wherein the L value is 75–76.1.

11. The composition of claim 2 wherein said b value is less than about 8.

12. The composition of claim 2 wherein said b value is less than about 6.

13. The composition of claim 2 wherein said b value is less than about 5.

14. The composition of claim 2 wherein said b value is 4.06 or less.

15. The composition of claim 2 wherein the L value is 75 or higher.

16. The composition of claim 2 wherein said b value is 2.77–4.06.

17. The composition of claim 2 wherein the L value is 75–76.1.

18. The composition of claim 1 prepared by a process comprising contacting, in the presence of a catalyst, an acid with 1,3-propanediol wherein said catalyst comprises tin and titanium.

19. The composition of claim 1 wherein the poly (trimethylene terephthalate) polymer composition further comprises up to 20 mole percent of repeat units derived from (a) one or more acid selected from the group consisting of isophthalic acid, naphthalenedicarboxylic acid, succinic acid, adipic acid, phthalic acid and glutaric acid, and (b) one or more glycol selected from the group consisting of ethylene glycol, propylene glycol, isopropylene gylcol, butylene glycol, 1-methyl propylene glycol, pentylene glycol, diethylene glycol, triethylene glycol.

20. The composition of claim 13 the process is carried out with a mole ratio of 1,3-propanediol to said terephthalic acid is in the range from about 1.1:1 to about 2.2:1 and at a temperature in the range of from about 155°C. to about 250°C., wherein the tin is present in the amount between about 10 to 100 ppm based on the weight of said terephthalic acid and wherein the titanium is present in the amount of 10 to 200 ppm based on the weight of said terephthalic acid.

21. The composition of claim 20 wherein the L value is 75 or higher.

* * * * *

UNITED STATES PATENT AND TRADEMARK OFFICE
CERTIFICATE OF CORRECTION

PATENT NO. : 6,426,398 B2
DATED : July 30, 2002
INVENTOR(S) : Kurian Joseph V., Liang Yuanfeng and Putzig Donald E.

It is certified that error appears in the above-identified patent and that said Letters Patent is hereby corrected as shown below:

<u>Title page,</u>
Item [57], ABSTRACT
Line 7, replace "comnprising" with -- comprising --
Lines 12 and 13, replace "terephthalalte" with -- terephthalate --

Signed and Sealed this

Twenty-eighth Day of September, 2004

JON W. DUDAS
*Director of the United States Patent and Trademark Office*